United States Patent
Jones

(10) Patent No.: US 6,309,437 B1
(45) Date of Patent: Oct. 30, 2001

(54) COMPUTER BOX FILTER COVER

(76) Inventor: William H. Jones, 3701 SW. Southern, Seattle, WA (US) 98126

(*) Notice: Subject to any disclaimer, the term of this patent is extended or adjusted under 35 U.S.C. 154(b) by 0 days.

(21) Appl. No.: 09/329,146

(22) Filed: Jun. 9, 1999

(51) Int. Cl.$^7$ ................................................. B01D 46/10
(52) U.S. Cl. ........................ 55/385.1; 55/385.6; 55/493; 55/496; 55/DIG. 31
(58) Field of Search ............................. 55/385.1, 385.6, 55/493, 495, 496, DIG. 31

(56) References Cited

U.S. PATENT DOCUMENTS

| | | | |
|---|---|---|---|
| 3,971,877 | 7/1976 | Lee | 174/16 R |
| 4,889,542 | * 12/1989 | Hayes . | |
| 5,223,006 | 6/1993 | Moran, III | 55/124 |
| 5,462,569 | * 10/1995 | Benjamin . | |
| 5,514,036 | * 5/1996 | Lin . | |
| 5,676,718 | 10/1997 | Davison et al. | 55/385.6 |
| 5,730,770 | * 3/1998 | Greisz . | |
| 5,766,285 | * 6/1998 | Killman . | |
| 5,772,713 | * 6/1998 | Salinas et al. . | |
| 5,935,282 | * 8/1999 | Lin . | |
| 5,997,614 | * 12/1999 | Tuma et al. . | |

* cited by examiner

Primary Examiner—David A. Simmons
Assistant Examiner—Fred Prince
(74) Attorney, Agent, or Firm—Dean A. Craine

(57) ABSTRACT

A computer box filter cover including a frame assembly that selectively attaches to a computer box and a door assembly that attaches to the frame assembly and that selectively closes over the entire front surface of the computer box. The frame assembly includes an extending lip which properly aligns the lower section of the frame assembly on the computer box so that the edges of the door assembly may be pressed against the edges of the frame assembly during use to form a seal around the front surface. The extending lip also allows the position of the frame assembly on the computer box to be adjusted so that the filter cover may be on different front surfaces. Located inside the door assembly is a filter and formed on the outside surface cover assembly opposite the filter is a plurality of air inlet openings through which air is drawn when the door assembly is closed over the front surface of the computer box. During assembly, the frame assembly is aligned and attached to the computer box in a position parallel and adjacent to the front surface. In a second embodiment, the lengths of the frame assembly and door assembly may be adjusted so that the filter cover may be used on different heights of computer boxes.

11 Claims, 4 Drawing Sheets

COMPUTER BOX FILTER COVER

BACKGROUND OF THE INVENTION

1. Field of the Invention

This invention relates to air filters for computers and, more particularly, to air filters designed to cover an entire surface of a computer box to filter air drawn into the computer box through openings on the surface.

2. Description of the Related Art

Located inside most computers is a fan which draws outside air into the computer box to cool the CPU and other components located inside. As the CPU's clock speed increases, a greater amount of air must be drawn into the computer box to cool the CPU. Unfortunately, when more air is drawn into the computer box, more dust and dirt accumulates inside.

It is widely known that a large quantity of the air drawn into the computer box enters through switch and light openings and through floppy and CD-ROM disc drive openings all located on the front surface of the computer box. It is also widely known that the shape or profile of the front surface on the computer box varies with different computer manufacturers. The height and width of the computer box varies also.

What is needed is a filter cover that can be selectively used to substantially cover different shaped front surfaces and different sizes of computer boxes.

SUMMARY OF THE INVENTION

It is an object of the present invention to provide a filter cover that substantially covers the front surface of a computer box.

It is an object of the present invention to provide such a filter cover that can be used on computer boxes with front surfaces having different shapes or profiles.

It is another object of the invention to provide such a filter cover that can be used with different sized computer boxes.

These and other objects of the present invention are met by a computer box filter cover for a computer box that includes a frame assembly that selectively attaches to a computer box, a door assembly that attaches to the frame assembly that during use, selectively opens and closes over the front surface of the computer box. Located inside the door assembly is an air filter. Formed on the outside surface of the door assembly opposite the filter is a plurality of air inlet openings. When the door assembly is closed over the front surface of the computer box, the fan located inside the computer box causes air to be drawn through the air inlet openings and filter and into the computer box. During assembly, the frame assembly is aligned and attached with a frame assembly attachment means to the computer box adjacent to the front surface. In the preferred embodiment a pivoting means, such as a pair of hinges, is disposed between the frame assembly and the door assembly to enable the door assembly to be selectively opened and closed thereon. The frame assembly includes an abutment means which properly aligns the frame assembly on the computer box so that the edges of the door assembly may press against the edges of the frame assembly during use thereby creating a seal. The door assembly is a relatively deep structure and the abutment means allows the position of the upper section of the frame assembly when attached to the computer box to be adjusted so that the filter cover may be used on different front surfaces. In another embodiment, the lengths of the frame assembly and door assembly may be adjusted so that the filter cover may be used on different heights and widths of computer boxes.

DESCRIPTION OF THE PREFERRED EMBODIMENT(S)

Figure 1:
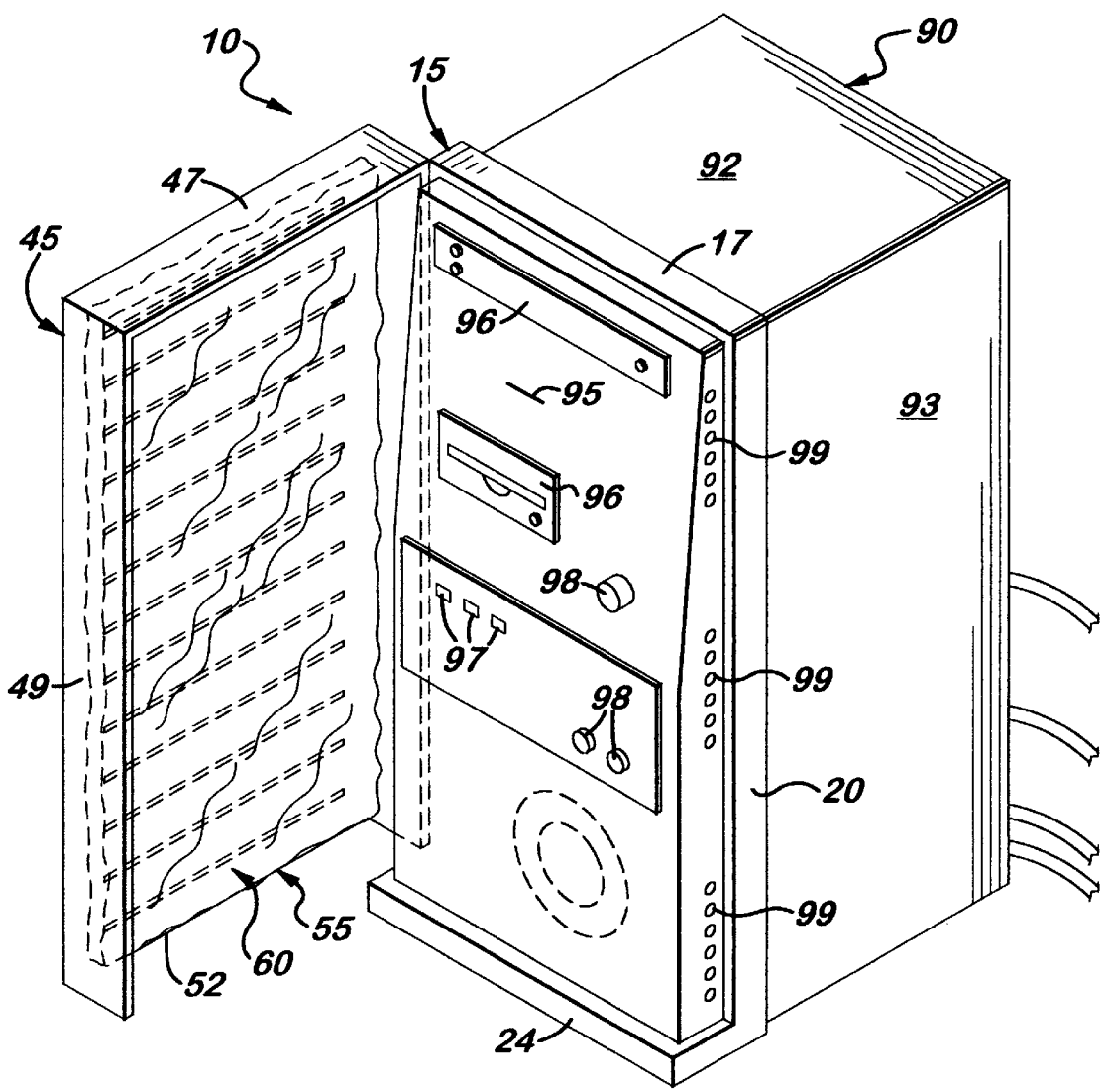
FIG. 1 is a perspective view of the computer box filter cover disclosed herein.
Figure 2:
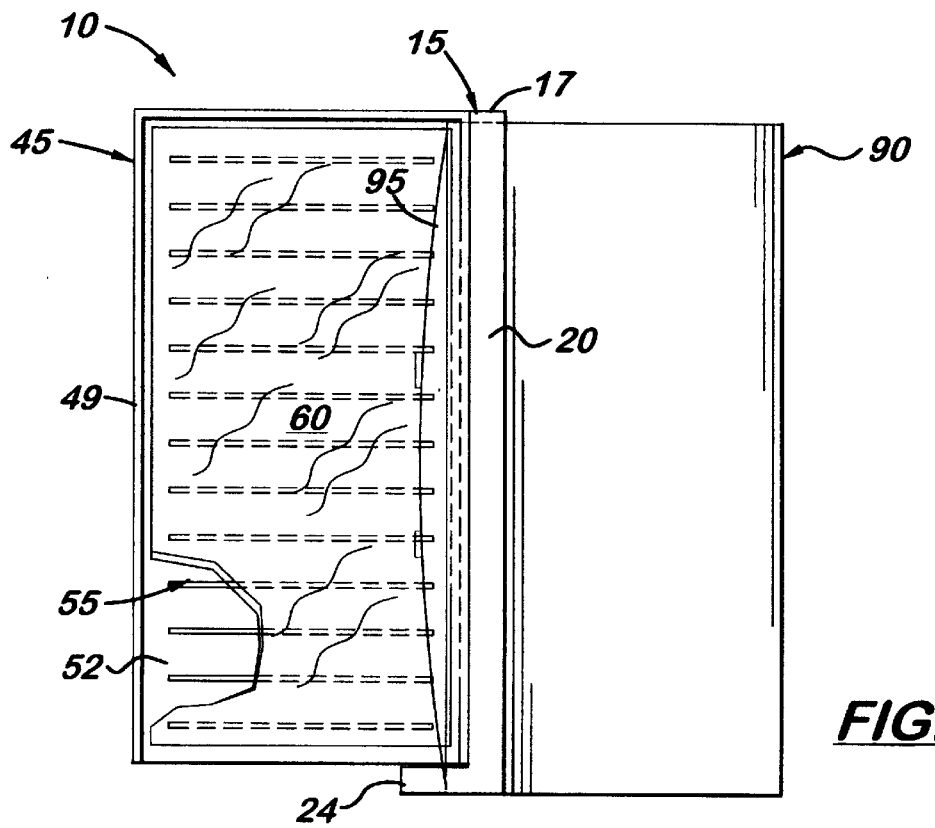
FIG. 2 is a left side elevational view of the filter cover attached to a computer box.

Shown in the accompanying FIGS. 1–17, there is shown a computer box filter cover 10 for a computer box 90 that includes a frame assembly 15 that selectively attaches to a computer box 90. The filter cover 10 also includes a door assembly 45 that pivotally attaches to the frame assembly 15 that, during use, selectively opens and closes over the front surface 95 of the computer box 90 to filter air drawn into the computer box 90 through various openings 96, 97, 98 formed on the front surface 95 and side opening 99 formed on the side 93 of the computer box 90. Located inside the door assembly 45 is an air filter 60, and formed the outside surface of the door assembly 45 is a plurality of air inlet openings 53 through which air may be drawn when the door assembly 45 is closed over the front surface 95 of the computer box 90. During assembly, the frame assembly 15 is transversely aligned and attached to the computer box 90 parallel and adjacent to the front surface 95. The frame assembly 15 includes an abutment means which properly aligns the frame assembly 15 on the computer box 90 so that the edges of the door assembly 45 press against the edges of the frame assembly 15 when the door assembly 45 is closed. The abutment means also allows the position of the frame assembly 15 on the computer box 90 to be adjusted so that the door assembly 45 may close on different shapes or profiles of front surfaces 95. In the preferred embodiment, the abutment means is a forward extending lip member 24 located on the lower section of the frame assembly 15. In a second embodiment shown in FIGS. 6–12, the length and width of the frame assembly 15 and the door assembly 45 may also be selectively adjusted so that the filter cover 10 may be used on different heights and widths of computer boxes 90.

Figure 3:
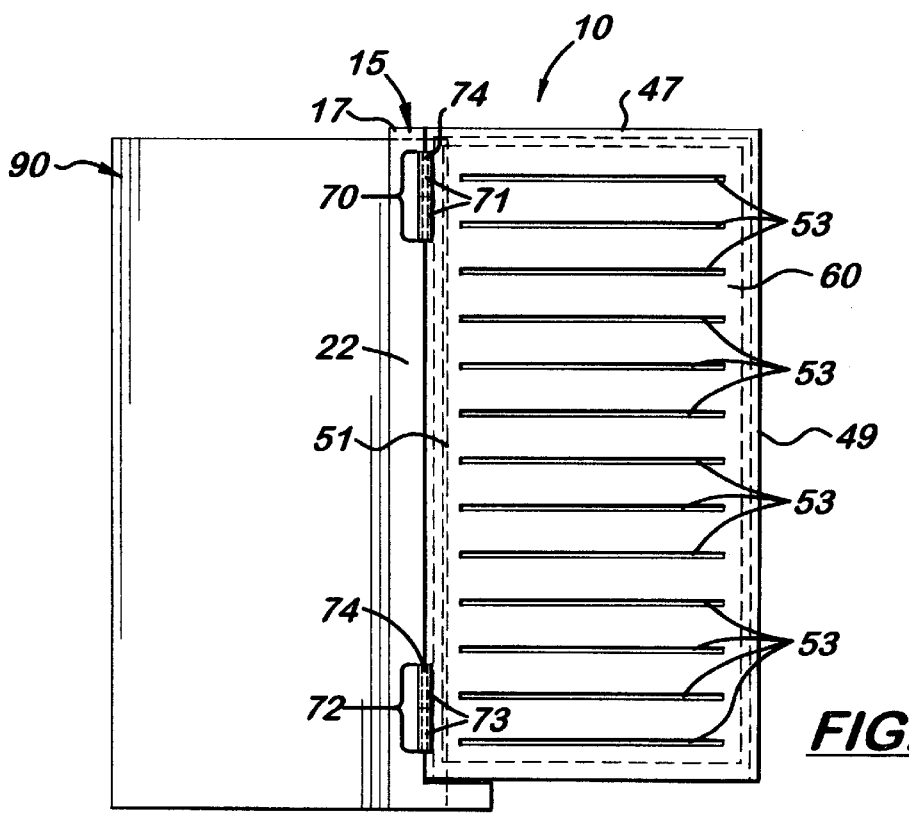
FIG. 3 is a right side elevational view of the filter cover attached to a computer box.
Figure 4:
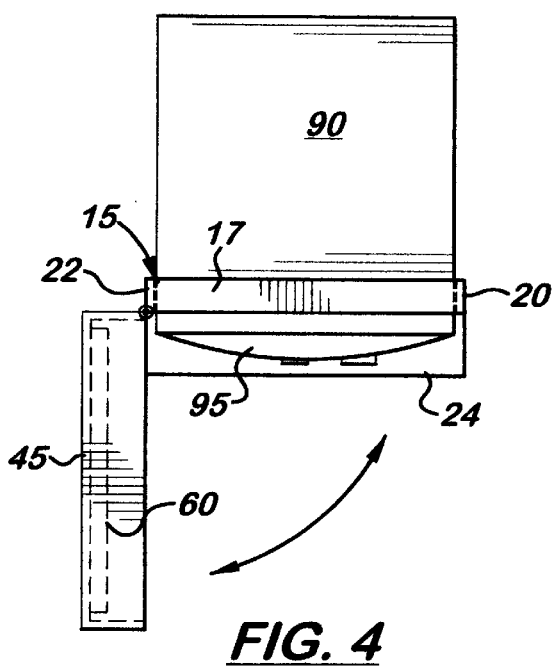
FIG. 4 is a top plan view of the filter cover attached to a computer box.
Figure 5:
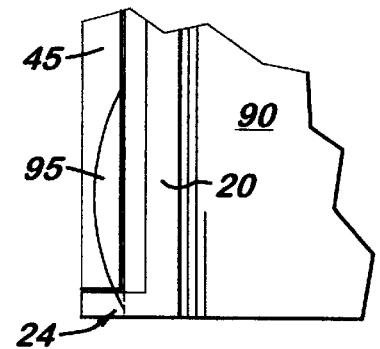
FIG. 5 is a partial, side elevational view of the filter cover.
Figure 6:
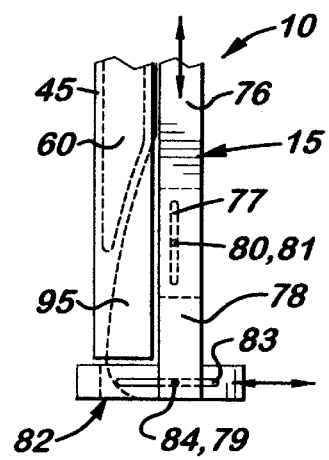
FIG. 6 is a partial, side elevational view of a second embodiment of the frame assembly with a length adjustable side member and a length adjustable lip member.
Figure 12:
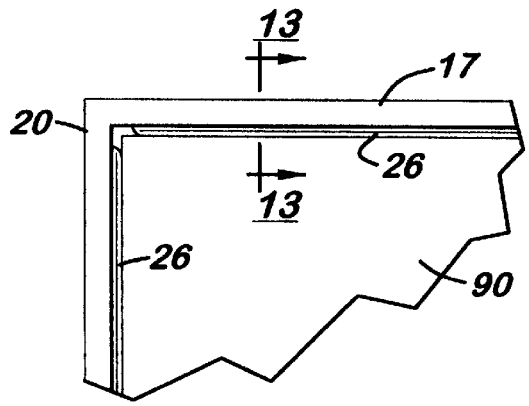
FIG. 12 is a partial, rear elevational view of the computer box and filter cover showing the position of the flap member attached to the frame assembly and used to create a compression force on the computer box to hold the frame assembly in place.
Figure 13:
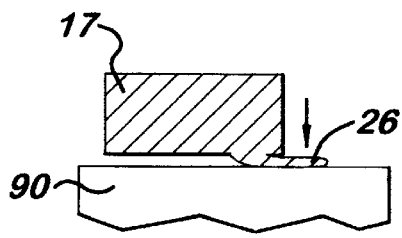
FIG. 13 is a sectional, side elevational view of the frame assembly taken along line 13—13 in FIG. 12.
Figure 14:
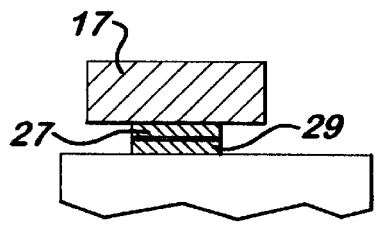
FIG. 14 is a sectional, side elevational view of the frame assembly attached to a computer box with hook and loop connectors.

More specifically, the frame assembly 15 includes an elongated top member 17, two side members 20, 22, and a lip member 24. In the embodiment shown in FIGS. 1–4, the top member 17, and two side members 20, 22, are elongated, rigid structures separately attached or integrally formed together to create an inverted, u-shaped structure that slides vertically and fits snugly around the computer box 90. As shown in FIG. 4, the top and side members 17, 20, and 22, respectively, all include means to attach them to the top and sides of the computer box 90. In FIGS. 12–13, the means to attach include a flap 26 formed on the inside surface of the members which is designed to apply an inward compression force against the top and sides of the computer box 90. As shown in FIG. 14, the flaps 26 may be replaced with hook and loop connector pads, 27, 29, respectively, adhesively attached to top and/or side members (17 shown only) and the sides of the computer box 90.

The lip member 24 is u-shaped structure, perpendicularly aligned and forward extending from the opposite lower ends of the two side members 20, 22. During use, the frame assembly 15 is placed over the computer box 90 so that the inside surface of the lip member 24 is pressed inward to make contact with the front, lower edge of the computer box 90. The lip member 24 acts to prevent the lower section of the frame assembly 15 from moving inward over the computer box 90, during use. When used in combination with the flaps 26, the lip member 24 and flaps 26 hold the frame assembly 15 in a secure position on the computer box 90.

The door assembly 45 is a deep, rectangular-shaped covering comprising a top panel 47, two parallel side panels 49, 51, and a front panel 52 all sufficient in length and size so that the door assembly 45 may cover the front surface 95 of the computer box 90 when closed there over. The width of the top panel 47 and two side panels 49, 51 are sufficiently wide to create a deep central space 55 inside the door assembly 45. A filter 60 and the front surface of the computer box 90 extends into the space 55 during use. The bottom of the door assembly 45 is open so that the lip member 24 discussed above may extend into the central space 55 when the door assembly 45 is closed. A plurality of air inlet openings 53 is also formed on the front panel 52 so that air may be drawn there through.

As mentioned above, the filter 60 is disposed inside the space 55 and adhesively attached to the inside surface of the door assembly 45. It is sufficient in length and width to cover all of the air inlet openings 53 formed on the front panel 52. In the preferred embodiment, the filter 60 is a HEPA filter capable of trapping particles 0.3 micron in diameter.

Attached to the adjoining side member of the frame assembly 15 and the side panel 49 of the door assembly 45 are two pairs of hinges 70, 72, respectively. As shown in FIG. 3 the adjoining pairs of hinges 70, 72 are connected together via pins 74 that extend through bores 71, 73, respectively formed on hinges 70, 72, respectively.

Today, computer boxes are manufactured in various rectangular sizes. The most common dimensions are 7 to 10 inches in width and 12 to 24 inches in height. The front surface of the computer box may be flat or extend forward ½ to 1¼ inches.

In FIGS. 6–12, a second embodiment of the filter cover 10 is shown comprising the frame assembly 15 and door assembly 45, respectively, each being adjustable in length and width to accommodate different sized computer boxes. This feature allows the filter cover 10' to be used on different computer boxes 90 having different heights and widths. The frame assembly 15 is adjustable in height by each side member including a longitudinally aligned fixed side member 76 and a sliding side member 78 which interconnect. A slot 77 is formed on the sliding member 76 through which an adjustment bolt 80 is extended which connects to a nut 81 that is tightened to lock the fixed and sliding side members 76, 78, respectively, together.

Figure 7:
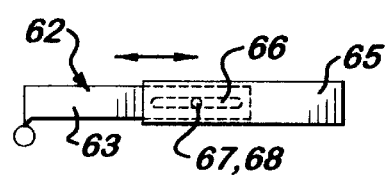
FIG. 7 is a top plan view of the adjustable top member on the frame assembly.

FIG. 7 shows an adjustable top member 62 including a fixed top member 63 and a sliding top member 65 longitudinally aligned and adjustably connected together with a bolt 67 and nut 68 extending through a slot 66 formed on the fixed top member 63.

Figure 8:
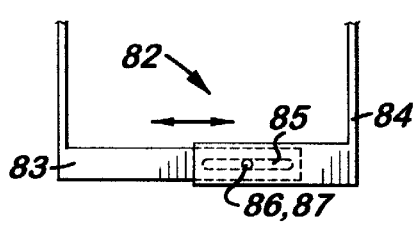
FIG. 8 is a front elevational view of the adjustable lip member.

FIG. 8 shows an adjustable lip member 82 including a fixed front member 83 and a sliding front member 84 also longitudinally aligned. A slot 85 is formed on the fixed front member 83 through which the bolt 86 may be extended and connected to a nut 87.

Figure 9:
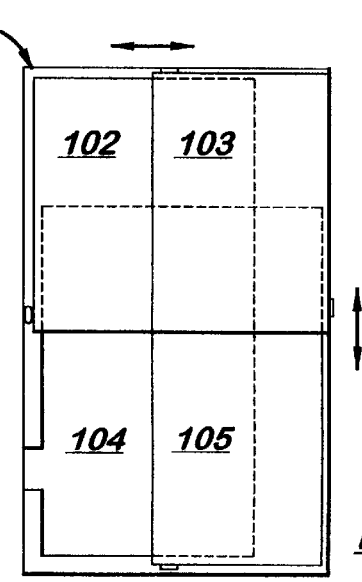
FIG. 9 is a front elevational view of the adjustable door assembly.
Figure 10:
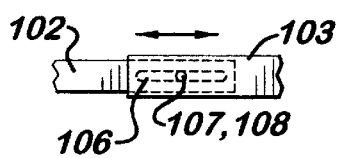
FIG. 10 is a top plan view of the adjustable door assembly.
Figure 11:
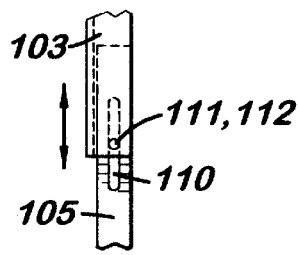
FIG. 11 is a side elevational view of the adjustable door assembly.

FIG. 9 is a front elevational view of the adjustable door assembly 100 that is adjustable in height and width. The door assembly 100 includes four adjustable panels 102, 103, 104, 105 which slide together to adjust the overall height and width of the door assembly 100. As shown in FIG. 10, the two top panels 102, 103 slide together and are connected together with a bolt 107 that extends through a slot 106 formed on the side member of one of the panels (103 shown) and connects to a nut 108. As shown in FIG. 11, the vertically aligned pair of top and bottom panels (103 and 105 shown) on each side of the door assembly 100 also slide together and are connected together by a bolt 111 extending through a slot 110 formed on one of the side members (of panel 103 shown) and also connected to a nut 112.

Figure 15:
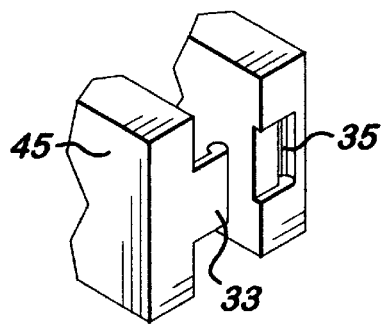
FIG. 15 is a perspective view of an optional locking means used to lock the door assembly to the frame assembly.

In another embodiment shown in FIG. 15, an optical locking means is disposed between the frame assembly 15 and the door assembly 45. The locking means comprises a rearward extending tab 33 formed on the side member of the door assembly 45 opposite die hinges 70, 72 and a recessed surface 35 formed on the adjacent side member (22 shown) of the frame assembly 15 which interconnect when the door assembly 45 is closed on the frame assembly 15.

Figure 16:
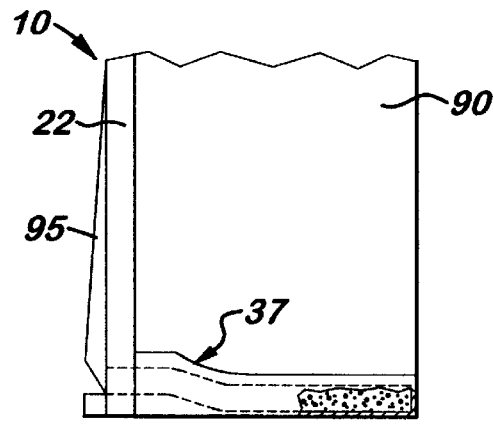
FIG. 16 is another embodiment of the filter cover with a hollow side channel which extends rearward from the frame assembly to transport air from the front surface to the air inlet holes located on the sides of the computer box.
Figure 17:
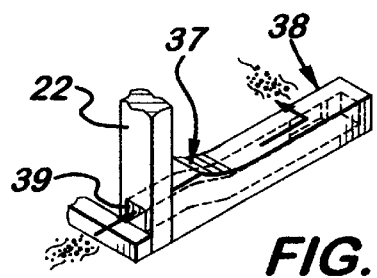
FIG. 17 is a partial perspective view of the hollow side channel attached to the frame assembly showing the flow of air through the side channel and into the air inlet openings.

FIGS. 16 and 17 show a third embodiment of the filter cover 10 with a hollow channel bar 37 designed to transport air from the front surface to side openings on the computer box 90. The channel bar 37 extends rearward from the lower end of the side member 22. The channel bar 37 includes a large rear opening 38 that covers a plurality of small inlet holes formed on the side of the computer box 90. Formed on the front surface of the side member 22 is a front opening 39 which enables cool air drawn through the air filter 60 to be delivered to the small inlet holes formed on the side of the computer box 90.

During use, the frame assembly 15 is placed around the computer box 90 adjacent to the front surface 96. The frame assembly 15 is positioned on the computer box 90 so that the inside surface of the lip member 24 is pressed tightly against the lower front edge of the computer box 90. The door assembly 45 may then be selectively opened or closed on the computer box 90.

In compliance with the statute the invention described herein has been described in language more or less specific as to structural features. It should be understood, however, that the invention is not limited to the specific features shown, since the means and construction shown comprise only the preferred embodiments for putting the invention into effect. The invention is therefore claimed in any of its forms or modifications within the legitimate and valid scope of the amended claims, appropriately interpreted in accordance with the doctrine of equivalents.

I claim:

1. A computer box filter cover, comprising:
   a. a frame assembly, said frame assembly capable of attaching to a computer box; said fame assembly includes a top member and two side members connected together to form an inverted, u-shaped structure capable of being slidingly attached to a computer box
   b. an attachment means on said frame assembly enabling said frame assembly to be properly aligned to said computer box;
   c. a door assembly capable of covering the front surface of said computer box, said door assembly including a plurality of air inlet openings;
   d. a filter placed inside said door assembly capable of covering said air inlet openings.

2. A computer box filter cover as recited in claim 1, further including an abutment means attached to said frame assembly capable of being pressed against the front surface of a computer box when said frame assembly is placed over the computer box, said abutment means capable of preventing rearward movement of said frame assembly over the computer box during use.

3. A computer box filter cover, as recited in claim 2 wherein said abutment means is a forward extending lip member that is transversely aligned over the front surface of the computer box.

4. A computer box filter cover, as recited in claim 3 wherein said door assembly is pivotally attached to said frame assembly.

5. A computer box filter cover, as recited in claim 3 further including a locking means capable of locking said door assembly in a closed position on said frame assembly.

6. A computer box filter cover, as recited in claim 1, wherein said frame assembly is adjustable in length to accommodate different lengths of computer boxes.

7. A computer box filter cover, as recited in claim 6, wherein said door assembly is adjustable in length.

8. A computer box filter cover, as recited in claim 1, wherein said frame assembly is adjustable in width to accommodate different widths of computer boxes.

9. A computer box filter comprising:
   a. a frame assembly, said frame assembly capable of attaching to a computer box;
   b. an attachment means on said frame assembly enabling said frame assembly to be properly aligned to said computer box;
   c. a door assembly capable of covering the front surface on a computer box, said door assembly including a plurality of air inlet openings; and
   d. a filter placed inside said door assembly capable of covering said air inlet openings, and;
   e. a hollow channel bar extending rearward from said frame assembly, said channel bar including a rear opening capable of being placed over air inlet openings formed on the sides of the computer box, said channel bar capable of delivering air from the front surface of said computer box to said air inlet openings on the sides of said computer box.

10. A computer box filter cover, comprising:
    a. a frame assembly including a top member and two side members connected together to form an inverted u-shape structure capable of being disposed around a computer box;
    b. a frame assembly attachment means to selectively attach said frame assembly to a computer box; said frame assembly attachment means including at least two flaps made of resilient material attached to said frame assembly, said flaps being disposed on opposite sides of the computer box and apply a compression force therein to hold said frame assembly on the computer box;
    c. a door assembly including a front panel capable of substantially covering a front surface of a computer box, said front panel including a plurality of air inlet openings enabling air to be drawn into the computer box;
    d. a pivoting means disposed between said frame assembly and said door assembly to pivotally attach said door assembly to said frame assembly; and,
    e. a filter disposed behind said front panel of said door assembly and covering said air inlet openings.

11. A computer box filter cover, as recited in claim 10, wherein said frame assembly attachment means is a pair of hook and loop connectors disposed between said frame assembly and the computer box capable of being interconnected to attach said frame assembly to the computer box.

* * * * *